United States Patent
Plante et al.

(10) Patent No.: US 7,058,824 B2
(45) Date of Patent: Jun. 6, 2006

(54) METHOD AND SYSTEM FOR USING IDLE THREADS TO ADAPTIVELY THROTTLE A COMPUTER

(75) Inventors: Stephane G. Plante, Kirkland, WA (US); John D. Vert, Seattle, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 09/882,076

(22) Filed: Jun. 15, 2001

(65) Prior Publication Data

US 2002/0194509 A1    Dec. 19, 2002

(51) Int. Cl.
G06F 1/26        (2006.01)

(52) U.S. Cl. .................. 713/300; 713/320; 713/322

(58) Field of Classification Search ................ 713/300, 713/320, 322, 323, 501, 321; 702/132; 711/109; 714/30

See application file for complete search history.

(56) References Cited

U.S. PATENT DOCUMENTS

| | | | | |
|---|---|---|---|---|
| 5,546,568 A | * | 8/1996 | Bland et al. ................ | 713/501 |
| 5,623,647 A | * | 4/1997 | Maitra ........................ | 713/501 |
| 5,719,800 A | * | 2/1998 | Mittal et al. ................ | 713/321 |
| 5,787,294 A | * | 7/1998 | Evoy .......................... | 713/320 |
| 5,974,557 A | * | 10/1999 | Thomas et al. ............. | 713/322 |
| 6,026,231 A | * | 2/2000 | Tymchenko ................ | 713/501 |
| 6,091,706 A | * | 7/2000 | Shaffer et al. .............. | 370/229 |
| 6,208,640 B1 | * | 3/2001 | Spell et al. ................. | 370/358 |
| 6,298,448 B1 | * | 10/2001 | Shaffer et al. .............. | 713/322 |
| 6,442,700 B1 | * | 8/2002 | Cooper ....................... | 713/320 |
| 6,470,456 B1 | * | 10/2002 | Chung-Chih ............... | 713/322 |
| 6,574,739 B1 | * | 6/2003 | Kung et al. ................. | 713/322 |
| 6,625,688 B1 | * | 9/2003 | Fruehling et al. ........... | 711/109 |
| 6,714,890 B1 | * | 3/2004 | Dai ............................ | 702/132 |
| 6,829,713 B1 | * | 12/2004 | Cooper et al. .............. | 713/320 |
| 6,845,456 B1 | * | 1/2005 | Menezes et al. ............ | 713/320 |

OTHER PUBLICATIONS

Lorch et al., "Reducing Processor Power Consumption by Improving Processor Time Management in a Single-User Operating System", *Proceedings of the Second Annual International Conference on Mobile Computing and Networking*, Rye, NY, Nov. 1996, pp. 143-154.

Havinga et al., "Octopus: Embracing the Energy Efficiency of Handheld Multimedia Computers", *Proceedings of the Fifth Annual ACM/IEEE International Conference on Mobile Computing and Networking*, Seattle, WA, Aug. 1999, pp. 77-87.

Benini et al., "System-Level Power Optimization: Techniques and Tools", *Proceedings of the 1999 International Symposium on Low Power Electronics and Design*, San Diego, CA, Aug. 1999, pp. 288-293.

Wolfe, "Opportunities and Obstacles in Low-Power System-Level CAD", *Proceedings of the 33rd Annual Conference on Design Automation*, Las Vegas, NV, Jun. 1996, pp. 15-20.

(Continued)

*Primary Examiner*—Thomas Lee
*Assistant Examiner*—Suresh K Suryawanshi
(74) *Attorney, Agent, or Firm*—Merchant & Gould P.C.

(57) ABSTRACT

A method and system for adaptively throttling a computer is provided. Prior CPU utilization is calculated when a CPU enters an idle state. If the prior CPU utilization warrants a change in the CPU performance level, an appropriate CPU performance level is calculated. Policies, including thermal policies and battery charge policies, may be applied to increase or decrease the appropriate CPU performance level. If prior CPU utilization and/or policies dictate a different CPU performance level, the CPU performance level is changed.

23 Claims, 9 Drawing Sheets

OTHER PUBLICATIONS

Benini et al., "Monitoring System Activity for OS-Directed Dynamic Power Management", *Proceedings of the 1998 International Symposium on Low Power Electronics and Design*, Monterey, CA, Aug. 1998, pp. 185-190.

Benini et al., "Dynamic Power Management of Electronic Systems," *Proceedings of the 1998 IEEE/ACM International Conference on Computer-Aided Design*, San Jose, CA, 1998, pp. 696-702.

Rudenko et al., "The Remote Processing Framework for Portable Computer Power Saving," *Proceedings the the 1999 ACM Symposium on Applied Computing*, San Antonio, TX, Feb./Mar. 1999, pp. 365-372.

Bellas et al., "Using Dynamic Cache Management Techniques to Reduce Energy in a High-Performance Processor," *Proceedings of the 1999 International Symposium on Low Power Electronics and Design*, San Diego, CA, Aug. 1999, pp. 64-69.

* cited by examiner

METHOD AND SYSTEM FOR USING IDLE THREADS TO ADAPTIVELY THROTTLE A COMPUTER

FIELD OF THE INVENTION

The present invention relates generally to computer-executable software, and more particularly to computer-executable software that controls the performance of a computer.

BACKGROUND

Generally, the faster a CPU runs, the more power the CPU consumes. When a CPU consumes more power, it uses more electricity and generates more heat. With desktop computers, using more power increases energy costs and cooling costs and causes computer manufacturers to spend more money designing and building systems to supply more power and dissipate more heat. This results in computers more expensive to build and operate.

In addition to these energy, design, and construction costs, portable computer users have additional disadvantages associated with CPU power consumption. When operating on battery power, the more power a CPU consumes, the less time the computer can operate without recharging the battery. Buying a bigger, heavier battery adds additional expense and weight to a portable computer. In addition, typically, a bigger battery does not reduce the heat the CPU produces. Reducing power consumption by using a slower CPU, on the other hand, also has disadvantages. A slower CPU reduces the overall performance of the portable computer and makes the portable computer less of a viable replacement for a desktop computer.

SUMMARY

The present invention is directed at providing a system and method for decreasing CPU power consumption while maintaining CPU performance. In accordance with a brief statement of the invention, prior CPU utilization is measured when the CPU is idle. For example, a usage determination procedure may be executed when the operating system has run out of work to perform. If CPU utilization warrants more processing speed, the CPU is instructed to increase processing speed, if possible. If CPU utilization indicates that less CPU processing speed could adequately fulfill processing needs, the CPU is instructed to decrease processing speed to consume less power. Lowering or increasing processing speed may also be affected by CPU temperature limits, battery considerations, and/or system policies.

In one aspect of the invention, CPU utilization is calculated when the CPU has no other executable tasks to perform. Then, depending on the CPU utilization, the CPU performance level is increased, decreased, or remains the same.

In another aspect of the invention, after CPU utilization is calculated, system policies are applied to determine whether to increase or decrease the CPU performance level. These system policies may include thermal and battery considerations. If the CPU utilization indicates that a different CPU performance level may be more appropriate and/or if the system policies dictate or allow a different CPU performance, the CPU performance level is changed appropriately.

There are several advantages to the present invention. It provides a method for reducing power consumption with little or no change to perceived system performance. By decreasing power consumption, devices that use battery power can operate longer before needing a recharge or battery replacement. The method can operate during a computer's idle time and thus not add the overhead or inaccuracies in calculating idle time that a constant, periodic CPU utilization calculation and adjustment might add.

DETAILED DESCRIPTION

The present invention provides a method and system for adaptively throttling a computer during the computer's idle times. First an illustrative operating environment for practicing the invention is disclosed. Then, an illustrative system for implementing an embodiment of the invention is described. Following the illustrative operating environment and system are disclosed illustrative methods for using the illustrative environment and system to adaptively throttle the computer.

Illustrative Operating Environment

Figure 1:
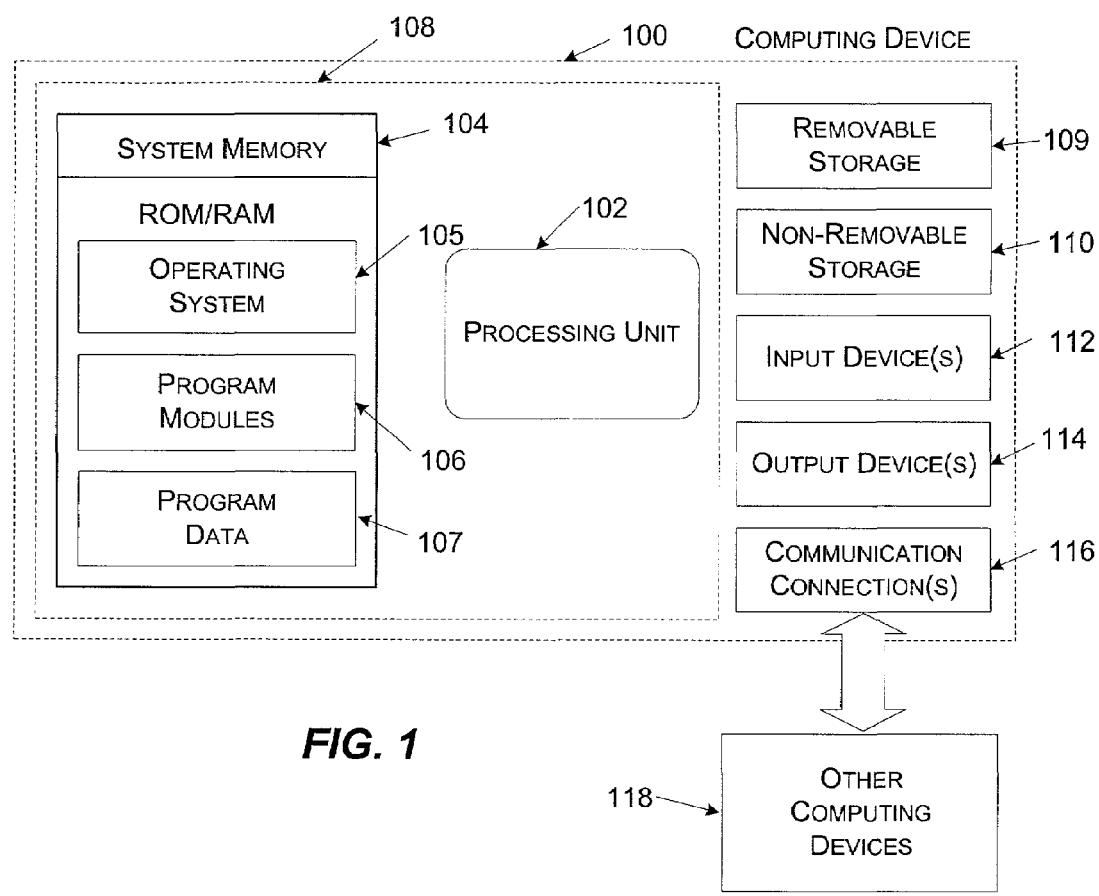
FIG. 1 is a functional block diagram of one computing device adapted to implement one embodiment of the invention.

With reference to FIG. 1, an exemplary system for implementing the invention includes a computing device, such as computing device 100. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, system memory 104 may be volatile (such as RAM), non-volatile (such as ROM, flash memory, etc.) or some combination of the two.

System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative CPU Throttling System

Figure 2:
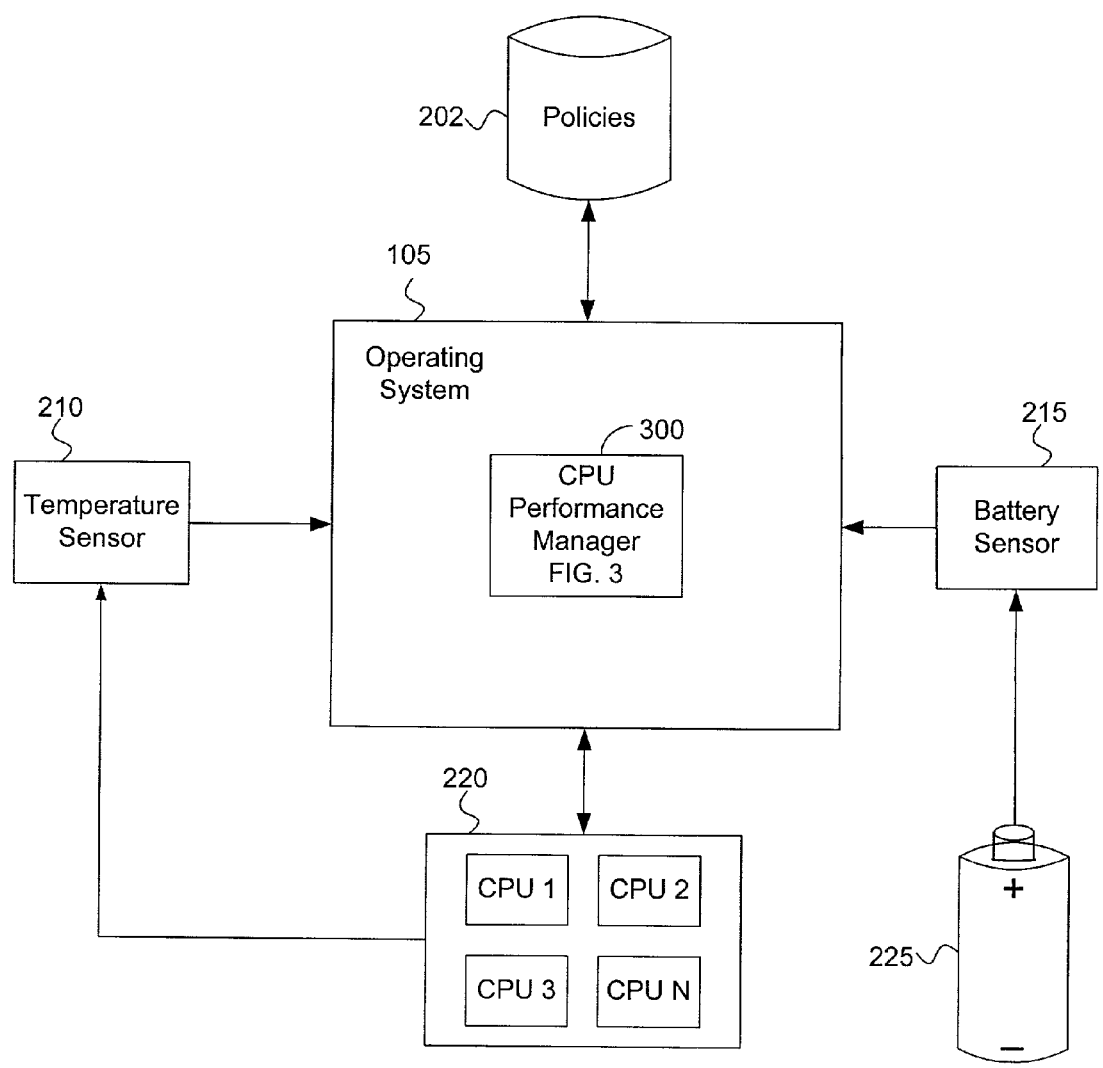
FIG. 2 is a functional block diagram illustrating a system adapted to throttle one or more CPUs to meet processing needs, according to one embodiment of the invention.

FIG. 2 is a functional block diagram illustrating a system adapted to throttle one or more CPUs to meet processing needs, according to one embodiment of the invention. This embodiment of the invention includes system policies 202, operating system 105 having CPU performance manager 300, temperature sensor 210, battery charge sensor 215, CPU array 220, and battery 225.

System policies 202 include various configuration data for the system. The data is placed in and accessed from system policies 202 by operating system 105. Operating system 105 uses the data for many purposes including, for example, restricting or giving a user access to certain resources, optimizing system performance to provide for quick response time in the case of a system dedicated to a single user or more throughput on a system serving many users or computers, and requiring users to provide more-difficult-to-guess passwords. A policy existing for one type of computers, e.g., battery-powered computers, may not exist on another type of computers, e.g., alternating current (A/C) powered computers. Alternatively, the same policy may exist on various types of computers, e.g. on both battery-powered and A/C powered computers, but the policy may specify different actions for different conditions, e.g. one set of actions when a computer is plugged into a power source and another set of actions when the computer is operating from battery power.

A battery-powered computer may have policies in system policy 202 for controlling resources for various circumstances. For example, system policy 202 may include a policy that instructs operating system 105 to operate the hardware to maximize performance at all times, possibly at the expense of using additional battery charge. Alternatively, system policy 202 may include a policy that instructs operating system 105 to operate the hardware to use less battery charge, possibly at the expense of performance. There may be a policy that causes operating system 105 to slow a CPU if the temperature exceeds a threshold. A policy may result in degraded performance in response to lowering battery charge. System policies 202 may include a policy causes switching latencies of CPU array 220 to be considered by CPU performance manager 300 when determining whether to change a CPU's performance level. For example, if a CPU takes a relatively long time to change performance, the policy may direct CPU performance manager 300 to switch less often. System policies 202 may include these and/or other policies and may have policies added, changed, or removed as needed or desired.

CPU array 220 includes one or more CPUs. The CPUs may be physically located together or communicating through connection(s) such as connection(s) 116 of FIG. 1. The CPUs may be homogeneous, i.e. all of the same type, or heterogeneous, i.e. of different types. CPU array 220 is configured to execute computer-executable software, including operating system 105, and to vary processing speed in response to requests from operating system 105.

Temperature sensor 210 is configured to measure the temperature of CPUs in CPU array 220 and to provide the measured temperature to operating system 105. In one embodiment of the invention, temperature sensor 210 measures the temperature of each CPU in CPU array 220. In another embodiment of the invention, temperature sensor 210 measures a temperature near CPU array 220. In yet another embodiment of the invention, temperature sensor 210 measures a temperature slightly related or unrelated to the temperature of the CPUs in CPU array 220. In some embodiments, temperature sensor 210 interrupts operating system 105 to indicate that the temperature has changed. In other embodiments, operating system 105 polls temperature sensor 210 to determine a change in temperature.

Battery charge sensor 215 is configured to measure the charge remaining in battery 225 and provide this measurement to operating system 105. In one embodiment of the invention, battery charge sensor 215 interrupts operating system 105 when the charge on battery 225 crosses a threshold. In another embodiment of the invention, operating system 105 periodically polls battery charge sensor 215 to determine the charge on battery 225.

Operating system 105 is configured, among other things, to access system policies 202, to receive temperature information from temperature sensor 210, to receive battery charge information from battery charge sensor 215, and to cause CPU performance levels to change for CPU array 220. Operating system 105 includes CPU performance manager 300 which is described in more detail in conjunction with FIG. 3. Briefly, CPU performance manager 300 determines when, based on various data received by and/or contained in operating system 105, to request more or less CPU performance.

Battery 225 provides power to the system of FIG. 2. Generally, battery 225 includes any device which has a limited amount of energy that can be provided to another device and in which the remaining amount of energy can be measured. In some embodiments of the invention, battery 225 includes a portable battery typically provided with a portable computer. In other embodiments of the invention, battery 225 includes an uninterruptible power source which provides backup power when standard power sources are interrupted. In yet other embodiments of the invention, battery 225 includes a power generator that has a limited fuel supply. Battery 225 may simultaneously be providing power to other systems than the one described in FIG. 2.

In another embodiment of the invention, the system of FIG. 2 is powered by an A/C source in addition to or in lieu of battery 225. When operating on A/C, a computer will not generally run out of power, but by selecting less CPU performance when the maximum CPU performance is not needed, for example, when the computer is not being used, CPU performance manager 300 may reduce energy consumed and heat generated.

Figure 3:
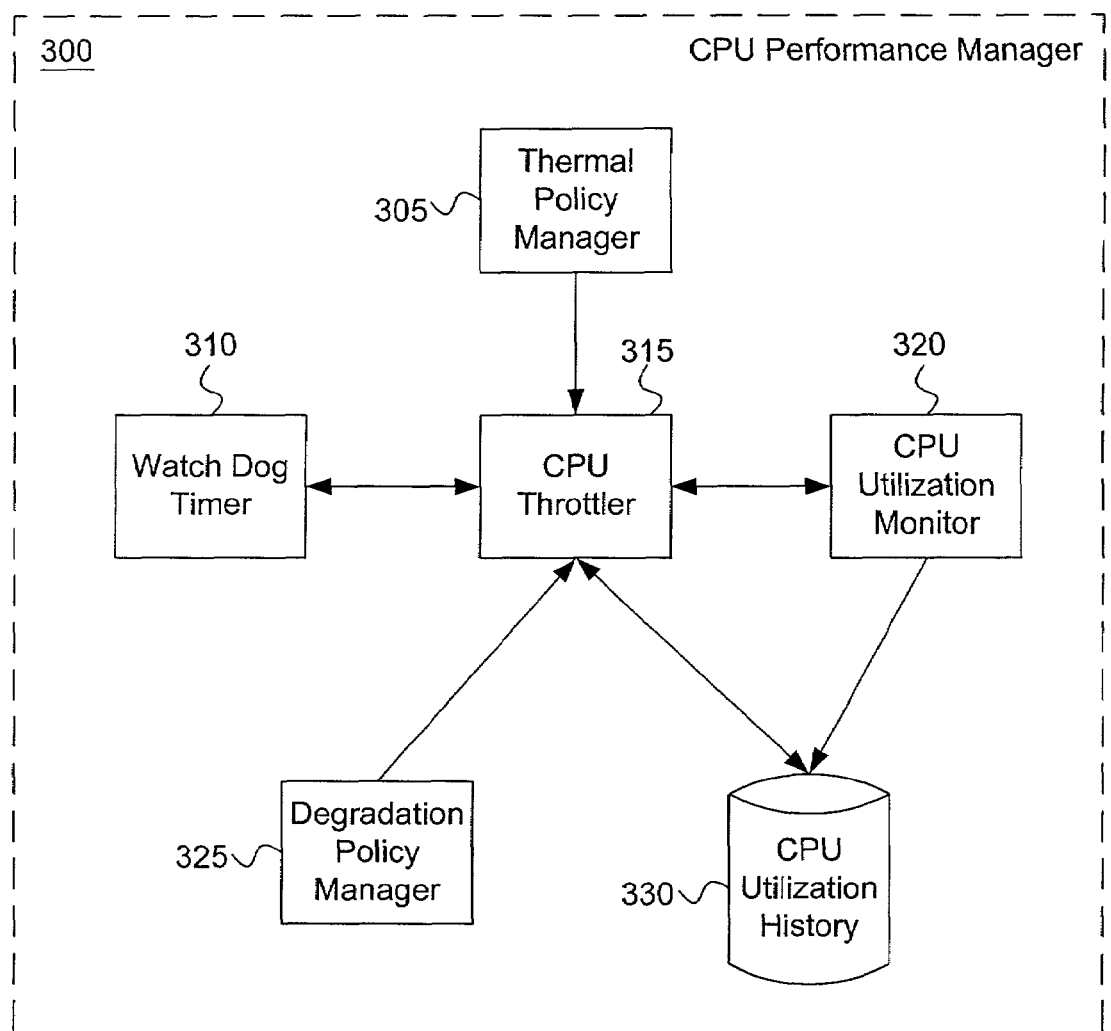
FIG. 3 is a functional block diagram illustrating a system adapted to determine and set the appropriate levels of performances for one or more CPUs, according to one embodiment of the invention.

FIG. 3 illustrates in greater detail CPU performance manager 300 which determines the appropriate levels of performances for one or more CPUs (not shown), hereinafter referred to as "the CPU". CPU performance manager 300 includes watch dog timer 310, CPU throttler 315, CPU utilization monitor 320, and CPU utilization history 330. The CPU performance manager may include thermal policy manager 305 and degradation policy manager 325.

Thermal policy manager 305 is configured to receive the temperature information generated by temperature sensor 210 of FIG. 2 and to provide a thermal CPU performance limit, if needed, to CPU throttler 315. The CPU that thermal policy manager 305 is receiving temperature information about may be hotter than appropriate. For example, the CPU may be operating in a hot room, or possibly, a fan cooling the CPU has failed. Under these conditions, continuing to operate the CPU at its current performance level may damage it. Thermal policy manager 305 determines if a harmful temperature situation is occurring and calculates an appropriate performance level for the affected CPU.

Degradation policy manager 325 is configured to receive the battery charge information generated by battery charge sensor 215 of FIG. 2 and to provide a battery CPU performance limit, if needed, to CPU throttler 315. Using policy information received from system policies 202, degradation policy manager 325 may determine, for example, that to maintain system operation for a specified period of time, the CPU should consume less power. To consume less power, the CPU may be instructed to decrease performance. Degradation policy manager 325 determines the degraded performance limit for the CPU and supplies this limit to CPU throttler 315.

CPU utilization monitor 320 is configured to monitor the one or more CPU utilizations and to report the utilizations monitored to CPU throttler 315. CPU utilization monitor 320 may be activated by CPU throttler 315, watch dog timer 310, or by other components. Typically, CPU utilization monitor 320 is activated when a monitored CPU enters an "idle" state. The CPU may idle for a variety of reasons. For example, the CPU may have several tasks it is performing, but the CPU is waiting for Input/Output (I/O) operations to complete. The CPU, for example, may be waiting for a user to respond to a prompt, a disk request to return data, or a network event to occur. In accordance with an embodiment of the invention, during this idle time, the CPU is instructed to calculate its utilization.

Causing the CPU to calculate its utilization during idle time has many advantages. One advantage is that it avoids the overhead of a periodic utilization calculation. For example, if the CPU is instructed to calculate its utilization on a periodic basis, such as every few microseconds, the calculations may distract the CPU from other more-essential processing. If the CPU is busy with such other processing, taking frequent time outs to calculate utilization adds to the CPU's work load and slows the other processing. By having the CPU calculate its utilization during idle time, utilization statistics can be gathered without burdening the other processing.

Watch dog timer 310 is configured to activate CPU throttler 315 after a timeout period. This is done to avoid some problems associated with activating CPU throttler 315 only when the CPU is idle. CPU utilization is often non-uniform. The CPU often completes a computationally intensive task and finds that no more tasks are pending. The CPU then enters an idle state waiting for more tasks to arrive. During the idle state, CPU throttler 315 may reduce the CPU's performance level to reduce power consumed and heat generated. Shortly thereafter, a long, computationally intensive task may arrive. The CPU, still set at the low performance level, begins working on the task. The task may be such that at the current performance level, from the time the CPU receives the task to the time the task completes, the CPU never enters an idle state. If CPU throttler 315 is only activated during idle times, it would not have an opportunity to increase the CPU performance level to speed execution of the task. After the task completes, CPU throttler 315 may increase the performance level of the CPU (based on preceding utilization), but no tasks may be pending. So by only operating when the CPU enters the idle state, CPU throttler 315 may not be able to increase the CPU's performance level when needed and additionally may increase the CPU's performance level when it is not needed. By activating CPU throttler 315 after a time expires, watch dog timer 310 helps CPU throttler 315 avoid allowing the CPU to execute a computationally intensive task at a low performance level.

Watch dog timer 310 may be embodied as a "run once" timer. That is, after activating CPU throttler 315 once, watch dog timer 310 may be configured to not activate CPU throttler 315 again unless reset.

CPU throttler 315 may be configured to reset watch dog timer 310 whenever CPU throttler 315 is activated. For example, before the time expires on watch dog timer 310, CPU throttler 315 may be activated because the CPU has entered an idle state. Rather than have the time expire on watch dog timer 310 at the time originally set, CPU throttler 315 may reset watch dog timer 310 to have its time expire at a later time. CPU throttler 315 may be activated again by the CPU entering an idle state before the later time on watch dog timer 310 expires. Upon activation, CPU throttler 315 may again reset watch dog timer 310 to expire at another later time. This process may be repeated several times. The result is that time on watch dog timer 310 only expires when the CPU is too busy to enter an idle state. A CPU is too busy to enter the idle state when it is fully utilized at its current performance level. When the CPU is fully utilized at its current performance level, however, it is a good indicator that a higher performance level for the CPU may be more appropriate. Thus, watch dog timer 310 typically only activates CPU throttler 315 when a task the CPU is working on could use higher performance.

Furthermore, CPU throttler 315 may disable watch dog timer 310. For example, the CPU may be running at its maximum performance level. While the CPU is running at its maximum performance level, it is not necessary to determine whether it can run even faster. Furthermore, interrupting the CPU at this time is counter-productive as it consumes CPU processing power. Therefore, CPU throttler 315 may temporarily disable watch dog timer 310 without concern that a task could use more CPU processing power as the CPU is currently configured to deliver all processing power available.

CPU throttler 315 may disable watch dog timer 310 for other reasons. For example, policies may dictate that given the CPU's temperature or the battery's charge, that the current CPU performance level is the highest performance level allowable. Until the temperature decreases, the battery charge increases, the policies change, or an idle state is reached and the performance level is lowered, there is no need to spend processing power determining whether more processing power should be given. Thus, CPU throttler 315 may disable watch dog timer 310 until conditions change.

CPU utilization monitor 320 is configured to calculate CPU utilization statistics and send the statistics to CPU throttler 315. Additionally, it may be configured to store CPU utilization statistics in CPU utilization history 330. Typically, CPU utilization monitor 320 is only activated when a CPU it is monitoring enters an idle state. CPU utilization monitor 320 may be activated at other times such as by watch dog timer 310 or when CPU throttler 315 requests CPU utilization statistics.

CPU utilization monitor 320 may calculate CPU utilization in many different ways. For example, it may query the operating system for user time and kernel time within the last period. It may add these times together to compute total CPU time. Idle time divided by the total CPU time for the last period gives a percentage of time spent in the idle state. Utilization for the last period can be calculated by subtracting this percentage from one hundred percent.

Alternatively, CPU utilization monitor 320 may itself tally user, kernel, and idle time. Then, using the preceding method, it may calculate an idle and/or a utilized percentage. CPU utilization monitor 320 may use any combination of tallying, querying, or other technique to determine idleness and utilization.

CPU utilization history 330 is configured to send and receive CPU utilization statistics and store them for future use. CPU utilization statistics from CPU utilization history 330 may be used by CPU throttler 315 to determine when to change the CPU's performance level.

CPU throttler 315 is configured to receive information from thermal policy manager 305, watch dog timer 310, CPU utilization monitor 320, degradation policy manager 325, CPU utilization history 330, and system policies (not shown). CPU throttler 315 is also configured to send information to watch dog timer 310, CPU utilization history 330, and the CPU (not shown). CPU throttler 315's primary function is to determine appropriate performance levels for the one or more CPUs it controls based on information received and system policies. CPU throttler 315 may activate CPU utilization monitor to gather CPU utilization statistics. Typically, CPU throttler 315 is activated when a CPU enters an idle state, but it may also be activated at other times by any of the other components in FIG. 3 or by other processes (not shown). For example, thermal policy manager 305 may determine that the temperature of the CPU is too high and may activate CPU throttler 315 to lower the CPU performance level to decrease heat generated.

Figure 4:
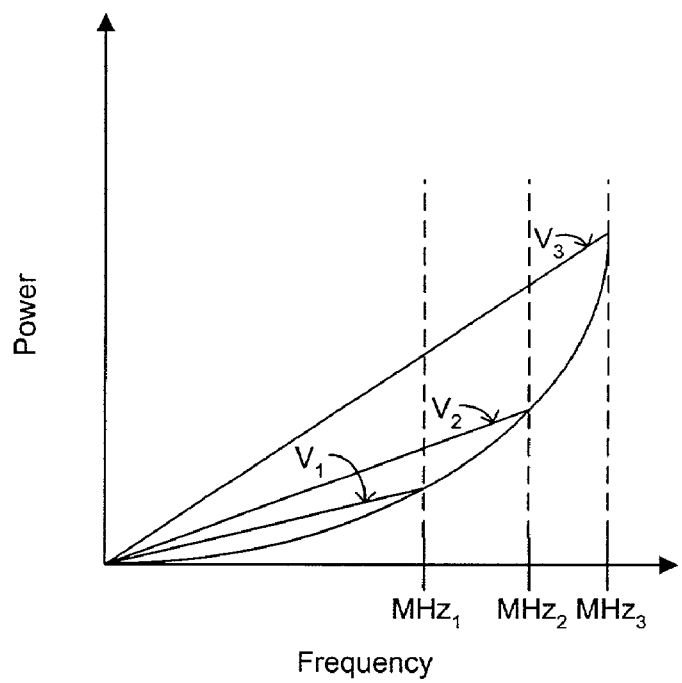
FIG. 4 is a diagram illustrating the power consumed by a CPU as the frequency and voltage of the CPU vary.

FIG. 4 is a diagram illustrating the power consumed by a CPU as the frequency and voltage of the CPU vary. In many CPUs, the power consumed by a CPU is directly related to the frequency at which the CPU runs. For example, a CPU running at 200 MHz will typically consume twice the power of the same CPU running at 100 MHz. On the other hand, typically, the power consumed by a CPU is directly related to the square of the voltage used by the CPU. For example, a CPU running at 2 volts will typically consume four times the power of the same CPU running at 1 volt.

Generally, the frequency at which the CPU operates directly relates to the amount of work the CPU can accomplish in a given amount of time. To achieve higher frequencies, normally a CPU must operate at a higher voltage. At lower frequencies, however, the CPU may operate on a range of voltages. For power consumption, ideally, a CPU throttler would determine the performance level required (in frequency) and select the least voltage that would allow that frequency. This would result in less power consumption for the selected frequency. Most power supplies supplying voltage to the CPU, however, are not capable of a supplying a continuous range of voltages. For example, a power supply may be able to supply only three different voltages, such as $V_1$, $V_2$, and $V_3$ as shown in FIG. 4. Furthermore, frequency suppliers generally provide only a limited number of frequencies at which to operate the CPU (not shown). Therefore, a CPU throttler, such as CPU throttler 315, is often constrained to take into account the voltage levels and frequency settings available.

Referring to FIG. 4, the CPU operating at $MHz_2$ consumes less power if the voltage supplied is $V_2$ instead of $V_3$. The CPU operating at $MHz_1$ consumes less power if the voltage supplied is $V_1$ instead of $V_2$ or $V_3$. At $MHz_3$, only $V_3$ is available.

Frequency modifications along the same voltage do not normally achieve much in the way of power conservation. For a given task, the CPU has a certain number of instructions to complete. Typically, if the CPU runs half as fast, it takes twice as long to complete the instructions. So, even though the CPU may be consuming half the power, it does so for twice as long which results in the same energy being consumed. In addition, as long as the CPU is operating, other devices such as a disk drive, device bus, memory, etc., may also be operating (and consuming power). The power consumed by these devices is less sensitive to the frequency of the CPU, i.e. these devices consume approximately the same amount of power whether the CPU is running fast or slow. As it takes longer to complete the task when running at a slower speed, even though the CPU consumes approximately its normal energy, the other devices consume twice the energy they would if the CPU were running at the faster speed. Thus, the total energy consumed to complete the task at the slower CPU rate is more than the energy consumed at the faster CPU rate.

If the CPU completes the task as quickly as possible, on the other hand, it may be able to enter a power saving mode while waiting for the next task. During the power saving mode, it may be able to conserve power consumption on the other devices, e.g. by shutting down the hard drive, turning off the fan, etc., thus reducing the power consumption even more. At the same time, the task is completed more quickly and the computer appears more responsive to a user. Completing a task at the faster frequency setting for a given voltage is known as race to wait.

Briefly stated, CPU performance manager 300 of FIG. 3 typically maintains the highest frequency for the selected CPU voltage, causing the CPU to race to wait at that frequency. If more power savings are needed and/or other policies dictate, a lower voltage is chosen. When the lowest voltage available for the CPU has been selected, then the frequency may be decreased below the maximum available for that voltage if necessary to satisfy a policy such as a thermal policy.

Note that CPU performance manager 300 may also take into account the time it takes to switch a voltage or frequency (switching latency) in determining whether the voltage or frequency should be changed to increase or decrease CPU performance. For example, if a voltage change has a relatively long switching latency, CPU performance manager 300 may cause voltage changes less frequently to avoid the time lost while changing the voltage. Policies regarding performance level changing as it relates to the length of time it takes to change a performance level may be contained in a policy in system policies 202 of FIG. 2.

Figure 5:
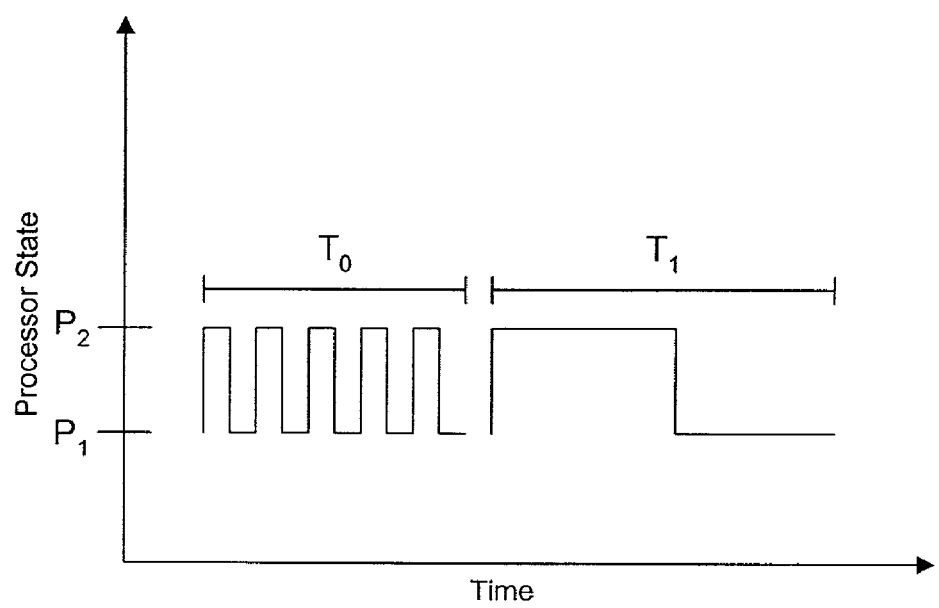
FIG. 5 is a diagram illustrating choices for processor performance level selections.

FIG. 5 is a diagram illustrating proper and improper choices for processor performance level selections. In time period $T_0$, the processor performance level varies frequently between $P_1$ and $P_2$. This may be caused by an over-aggressive CPU throttler that immediately throttles the CPU as soon as the CPU enters an idle state. Changing the processor performance level may take a considerable amount of time. During the change, the processor is unavailable to execute instructions. Consequently, processor performance may suffer, for instance, a DVD playback proceeding on the computer may skip a frame or a soft modem may lose a connection because the CPU did not respond in time to complete a needed operation. Such an occurrence may frustrate a user and should generally be avoided.

In time period $T_1$, the processor performance level varies less frequently between $P_1$ and $P_2$. With this less frequent level change, fewer DVD frames are lost and a soft modem will typically lose fewer connections. Generally, this is the desired response from CPU performance manager 300. CPU performance manager 300 accomplishes this less frequent level change in part by applying the system policies to information received from CPU utilization monitor 320 and CPU utilization history 330 as discussed in detail in conjunction with FIG. 7–10.

Illustrative CPU Throttling Methods

Figure 6:
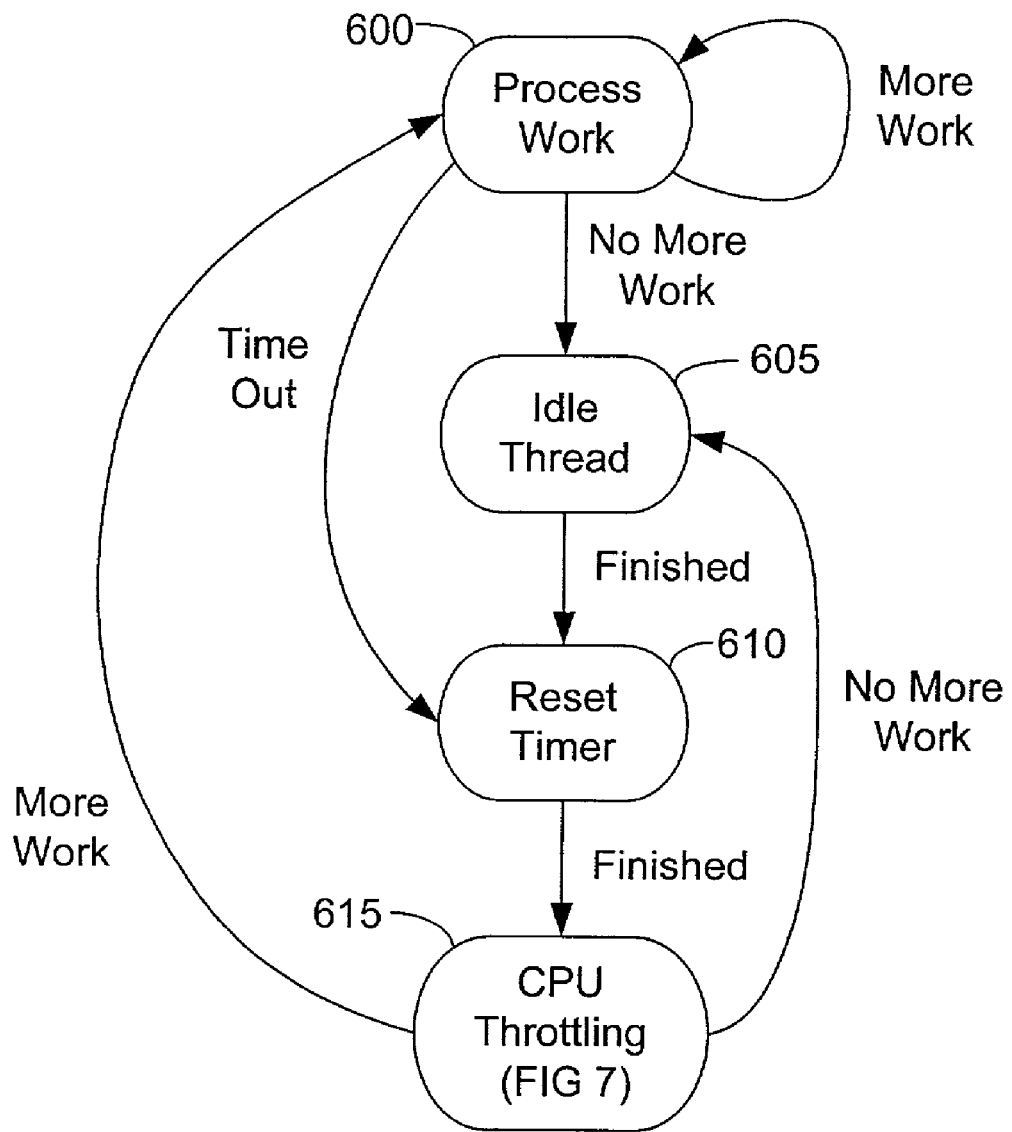
FIG. 6 is a state diagram illustrating various states for adaptively throttling a CPU, according to one embodiment of the invention.

FIG. 6 is a state diagram illustrating various states involved in adaptively throttling a CPU, according to one embodiment of the invention. The process begins in block 600, when the CPU is ready to execute work.

At block 600, as long as there is work the CPU can execute, the CPU executes the work. As discussed previously in conjunction with FIG. 3, sometimes the CPU may be performing a task, but it is waiting for I/O operations to complete. Typically, until the I/O operation completes, the CPU should not execute the next part of the task. The CPU may have work in other tasks it can execute. Sometimes, however, all tasks are waiting for I/O operations to complete. Alternatively, the CPU may have completed the pending tasks. At any such points, the CPU enters an idle state. For example, referring to FIG. 2, a CPU in CPU array 220 continues working on tasks until each task contains no executable work or until all tasks are complete. When the CPU idles, processing continues at block 605.

Alternatively, a timer, such as watch dog timer 310, may expire before the CPU enters an idle state. In this case, processing continues at block 610. For example, referring to FIG. 3, watch dog timer 310 activates CPU throttler 315 since the timeout occurred before an idle state activated CPU throttler 315.

At block 605, the idle thread is executed. Idle does not mean that the CPU is doing nothing. The CPU may be polling for work to do or seeing if any deferred procedure calls are pending. For example, referring to FIG. 2, a CPU in CPU array 220 executes work in operating system 105 to determine if more tasks are available. After block 605, processing continues at block 610.

At block 610, the timeout timer may be reset. If block 610 was reached from block 605, this indicates that utilization was checked before the time expired and avoids a needless utilization check in future processing. If block 610 was reached because of a timeout from block 600, this typically indicates that the CPU was fully utilized at its current performance level and that an increased performance level may be appropriate. As previously mentioned in conjunction with FIG. 3, for various reasons including, for example, if the CPU is already performing at a maximum performance level, the CPU throttler 315 may determine to not reset watch dog timer 310. For example, referring to FIG. 3, CPU throttler 315 resets watch dog timer 310, if appropriate. After the timeout timer is reset, if needed, processing continues at block 615.

Figure 7:
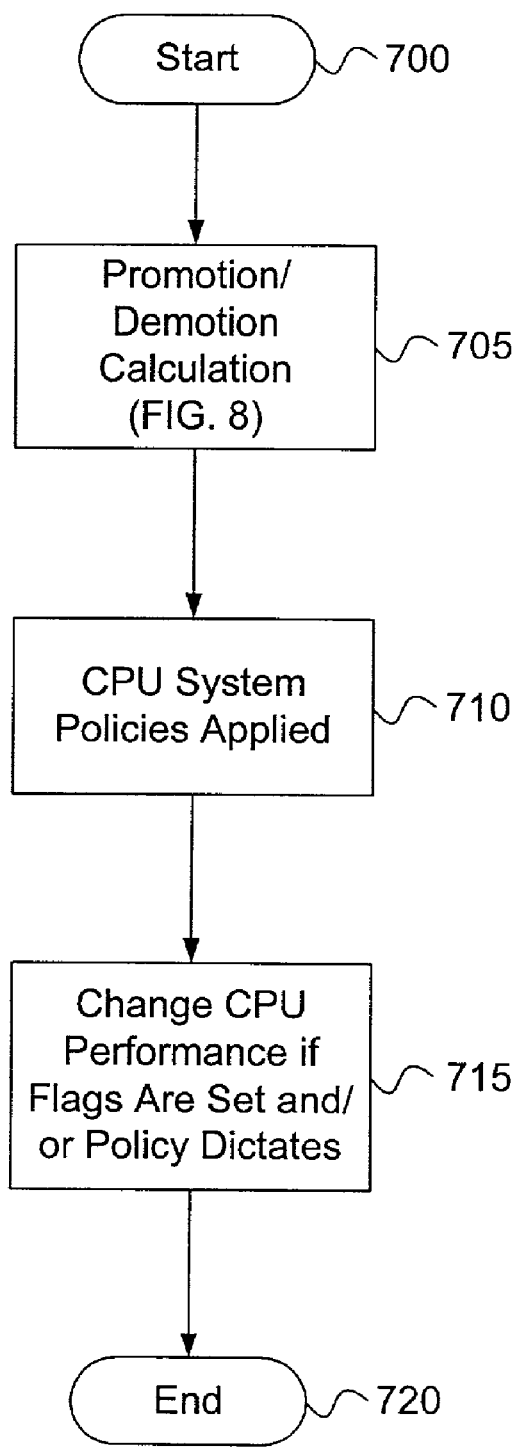
FIG. 7 is a logical flow diagram illustrating a process for determining whether a CPU performance level should be modified, and, if so, modifying it, according to one embodiment of the invention.

At block 615, CPU throttling processes are activated as described in detail in conjunction with FIG. 7. Briefly stated, CPU utilization for the prior period is calculated and policies are applied to determine if the CPU performance level should increase, remain the same, or decrease. If it is determined that the CPU performance level needs adjustment, this is done at this time. Referring to FIG. 3, CPU throttler 315 uses information from thermal policy manager 305, CPU utilization monitor 320, degradation policy manager 325, CPU utilization history 330, and system policies (not shown) to determine if the CPU performance level should increase, decrease, or remain the same. If the CPU performance level should change, CPU throttler 315 sends signals to change the CPU performance level. After block 615, if no executable instructions are available, processing returns to block 605. Otherwise, processing returns to block 600.

The process of FIG. 6 continues as long as the operating system continues to execute on the computer.

FIG. 7 is a logical flow diagram illustrating a process for determining whether a CPU performance level should be modified, and, if so, modifying it. The process starts at block 700 after it is determined that CPU utilization should be checked and the CPU performance level possibly modified.

At block 705, promotion/demotion calculations are performed to determine whether the CPU performance level should increase, decrease, or stay the same. These calculations are described in more detail in conjunction with FIG. 8. Briefly stated, utilization is calculated and if it exceeds a threshold and other criteria are satisfied, a promotion flag is set. If utilization is less than a threshold and other criteria are satisfied, a demotion flag is set. In another embodiment of the invention, rather than setting a flag, a desired CPU performance level may be calculated. For example, referring to FIG. 3, CPU utilization monitor 320 calculates the CPU's utilization, possibly stores the utilization in CPU utilization history 330, and sends the utilization statistics to CPU throttler 315.

At block 710, system policies are applied to determine whether the CPU performance level should be changed. Such policies include temperature of the CPU, battery charge left, etc. as previously discussed. In one embodiment of the invention, system policies may indicate that the CPU performance level should be greater than, less than, or equal to the desired CPU performance level indicated by the promotion/demotion calculation of block 705. For example, referring to FIG. 3, thermal policy manager 305 and degradation policy manager 325 apply system policies to determine if the CPU performance level should be changed. Then, they pass this information to CPU throttler 315.

In another embodiment of the invention, system policies are applied but can only keep the same or decrease the performance level from that calculated at block 705. For example, even though prior CPU utilization indicates that an increased CPU performance level may speed processing, in order to avoid a temperature problem, thermal policy indicates that the CPU performance level should not be increased. In order to conserve battery charge, battery charge policy may indicate that the CPU performance level should be decreased even further. Thus, at block 705 a "high water mark" of CPU performance level may be set, and at block 710, system policies may dictate a lower CPU performance level.

At block 715, the CPU performance level is changed if promotion or demotion flags are set and/or if system policies dictate. For example, referring to FIG. 3, CPU throttler 315 sends control signals to increase the performance level of the CPU because CPU utilization is high, CPU temperature is acceptable, and battery charge is sufficient.

At block 720, processing ends and the CPU's performance level has been changed, if needed.

Figure 8:
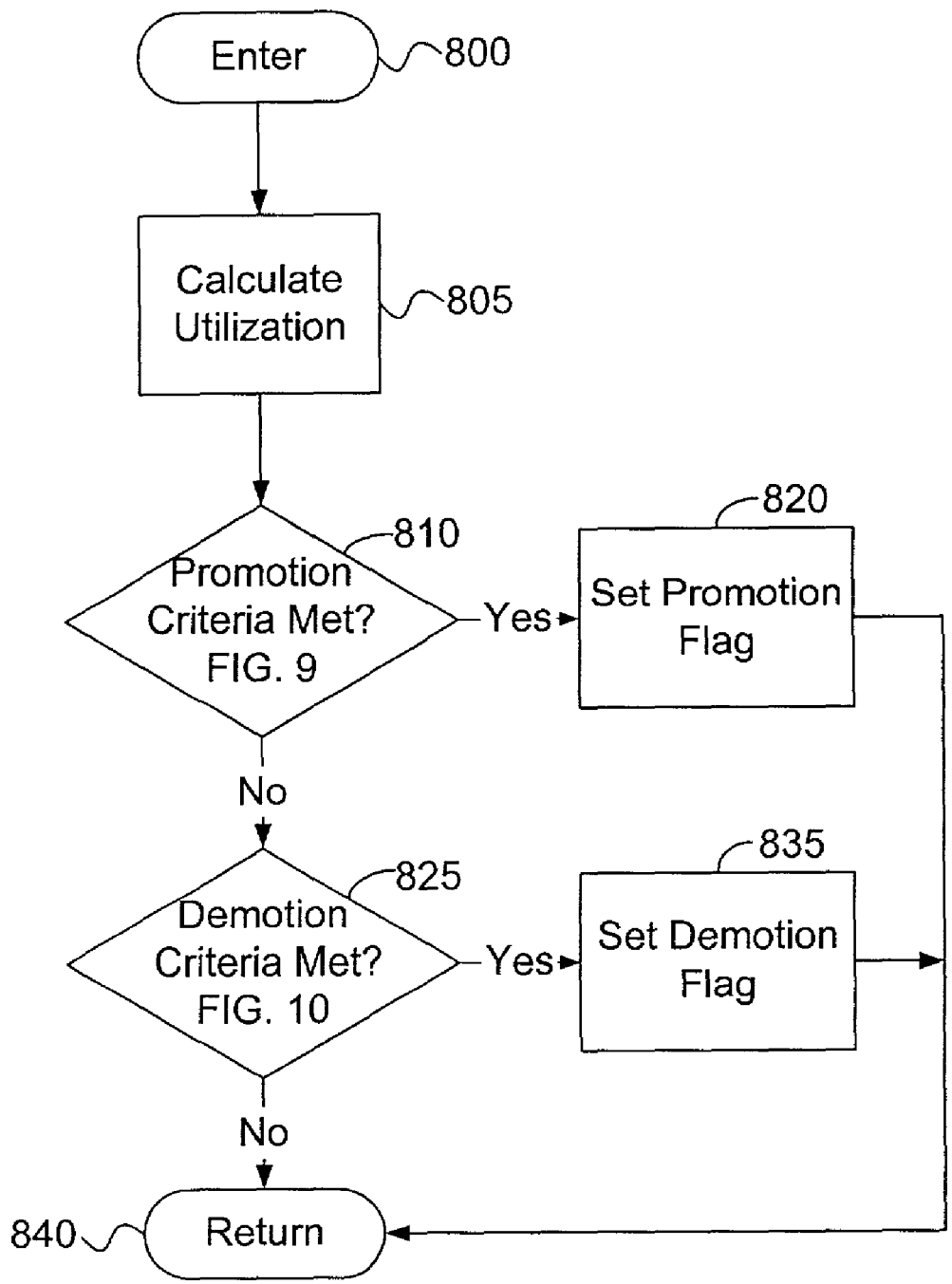
FIG. 8 is a logical flow diagram illustrating a process to determine whether a CPU performance level should be changed, according to one embodiment of the invention.

FIG. 8 is a logical flow diagram illustrating calculations performed to determine whether a CPU performance level should be increased, decreased, or remain the same, according to one embodiment of the invention. The process starts at block 800 when a promotion/demotion determination is needed.

At block 805, the CPU utilization is calculated. For example, referring to FIG. 320, CPU utilization monitor 320 calculates the CPU utilization during the previous period, possibly stores the utilization statistics in CPU utilization history 330, and sends the utilization statistics to CPU throttler 315.

At block 810, a determination is made as to whether promotion criteria are met. When promotion criteria are met, CPU utilization indicates that an increased CPU performance level may be appropriate. This determination is described in more detail in conjunction with FIG. 9. For example, referring to FIG. 3, CPU throttler 315 determines, based on the utilization statistics received from CPU utilization monitor 320, whether promotion criteria are met. If promotion criteria are met, the yes branch is taken and processing continues at block 820. Otherwise, the no branch is taken and processing continues at block 825.

At block 820, a promotion flag is set indicating that promotion criteria have been met, i.e. prior CPU utilization justifies an increase in the CPU performance level. For example, referring to FIG. 3, CPU throttler sets a flag (not shown) indicating that promotion criteria have been met.

At block 825, a determination is made as to whether demotion criteria are met. When demotion criteria are met, prior CPU utilization indicates that a decreased CPU performance level may be appropriate. This determination is described in more detail in conjunction with FIG. 10. For example, referring to FIG. 3, CPU throttler 315 determines, based on the utilization statistics received from CPU utilization monitor 320, whether demotion criteria are met. If demotion criteria are met, the yes branch is taken and processing continues at block 835. Otherwise, the no branch is taken and processing continues at block 840.

At block 835, a demotion flag is set indicating that demotion criteria have been met, i.e. prior CPU utilization justifies a decrease in the CPU performance level. For example, referring to FIG. 3, CPU throttler sets a flag (not shown) indicating that demotion criteria have been met.

At block 840, processing ends. At this point, a promotion or a demotion flag has been set if prior CPU utilization justifies an increase, respectively, or decrease in the CPU performance level. The flag set may be the CPU performance level appropriate for the prior state of CPU utilization. In other words, the flag is not limited to a Boolean value and may include a numerical value representing a desired CPU performance level.

Furthermore, the flag may indicate that the CPU performance level should be changed more than one performance level from where it currently is. For example, the CPU may have just completed a computationally intensive task and have no additional tasks pending. During the past period, CPU utilization may have been zero percent. Rather than adjusting one CPU performance level down after a first utilization check and another performance level down after another utilization check, the flag may be set to indicate that the CPU performance level should be set at its lowest level.

Figure 9:
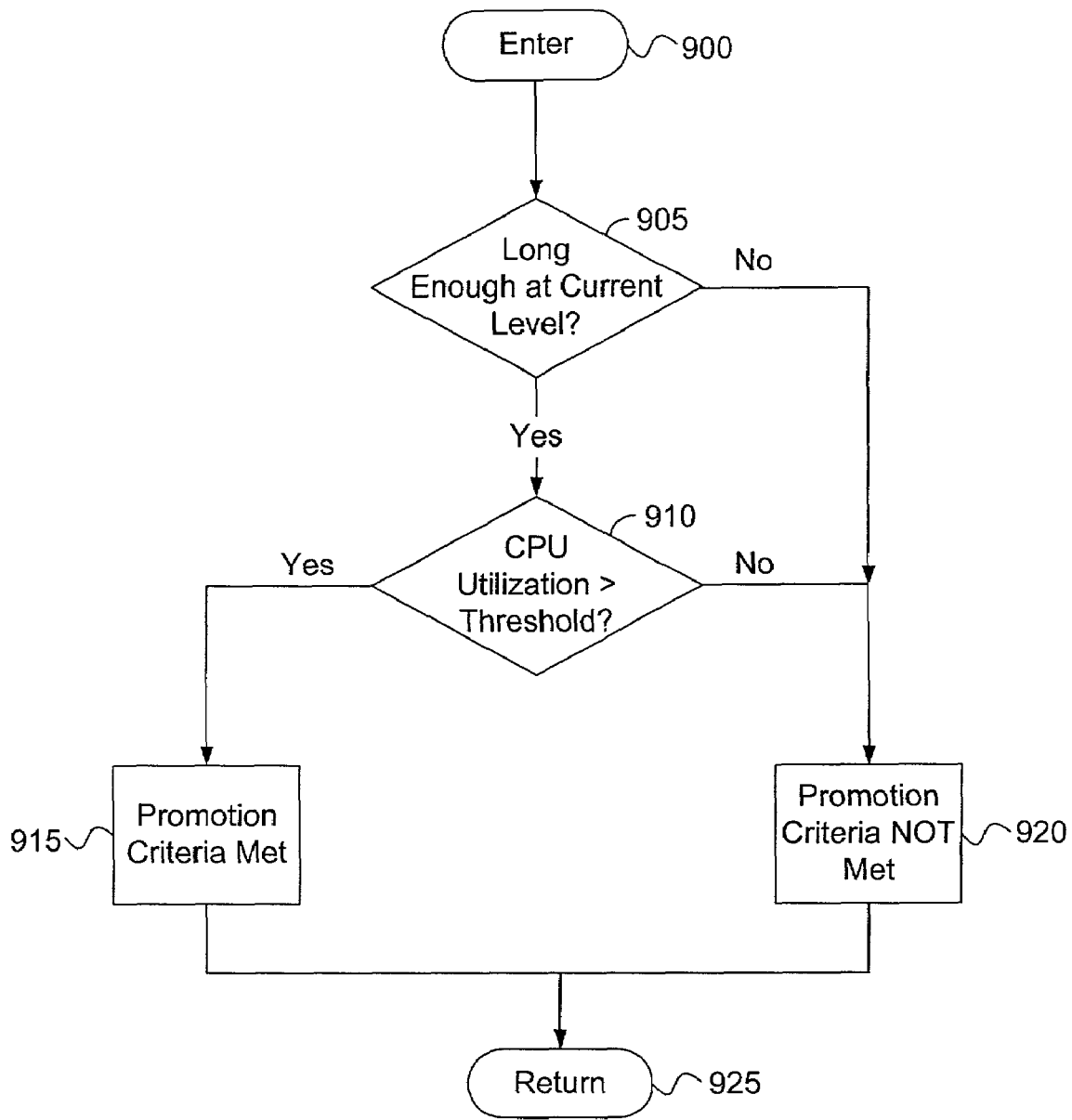
FIG. 9 is a logical flow diagram illustrating a process to determine if CPU utilization justifies an increase in CPU performance level, according to one embodiment of the invention.

FIG. 9 is a logical flow diagram illustrating a process to determine if prior CPU utilization justifies an increase in the CPU performance level, according to one embodiment of the invention. The process enters at block 900 from decision block 810 of FIG. 8, after prior CPU utilization has been calculated.

At block 905, a determination is made as to whether the CPU performance level has been at its current level long enough. The purpose of this logic is to avoid the problems associated with frequent transitions as described in conjunction with FIG. 5. Some experimentation may be necessary to determine an appropriate amount of time the CPU performance level should remain the same. Furthermore, the time the CPU performance level should remain the same may be longer before a transition to a lower CPU performance level than before a transition to a higher CPU performance level. In other words, how long a CPU throttler should wait before decreasing a CPU performance level may be longer than how long the CPU throttler should wait before increasing the CPU performance level.

The difference in time between increasing and decreasing the CPU performance level may be set to satisfy user tastes. The user may prefer that when a computational intensive task is given to the CPU, that the CPU performance level quickly ramp up to complete the task as this typically decreases the time the user must wait for the task to complete. Furthermore, a user may prefer that a computer err on the side of maintaining a high CPU performance level longer rather than aggressively decreasing the CPU performance level when the CPU becomes idle so that the system remains responsive to the user's requests. In light of this disclosure, those skilled in the art will recognize that many schemes with varying time waits before CPU performance level changes may be implemented without departing from the spirit and scope of this invention.

Continuing at block 905, if the CPU performance level has been at the same level long enough the yes branch is followed and processing continues at block 910. If the CPU performance level has not been at the same level long enough, the no branch is followed and processing continues at block 920. For example, referring to FIG. 3, CPU throttler 315 uses information from CPU utilization history 330 to determine whether the CPU performance level has been at the same level long enough.

At block 910, it is determined whether the CPU utilization exceeds a threshold or not. The threshold may be set at a value near the maximum CPU utilization at the current CPU performance level. For instance, if the CPU utilization is not close to the maximum CPU utilization for the current CPU performance level, the current CPU performance level is not being fully utilized so there is likely no need to increase the CPU performance level. For example, referring to FIG. 3, CPU throttler 315 uses the information received from CPU utilization monitor 320 to determine if the utilization exceeds the threshold. If the CPU utilization exceeds the threshold, the yes branch is followed to block 915. If the CPU utilization does not exceed the threshold, the no branch is followed to block 920.

At block 915, the promotion criteria have been met. Further calculations can use this information to act appropriately. For example, referring to FIG. 3, CPU throttler 315 determines that the promotion criteria have been met and sets a promotion flag (not shown).

At block 920, the promotion criteria have not been met. Further calculations can use this information to act appropriately. For example, referring to FIG. 3, CPU throttler 315 determines that the promotion criteria have not been met and clears a promotion flag (not shown).

At block 925, the process returns to block 825 of FIG. 8. At this point, it is known whether the promotion criteria have been met.

Figure 10:
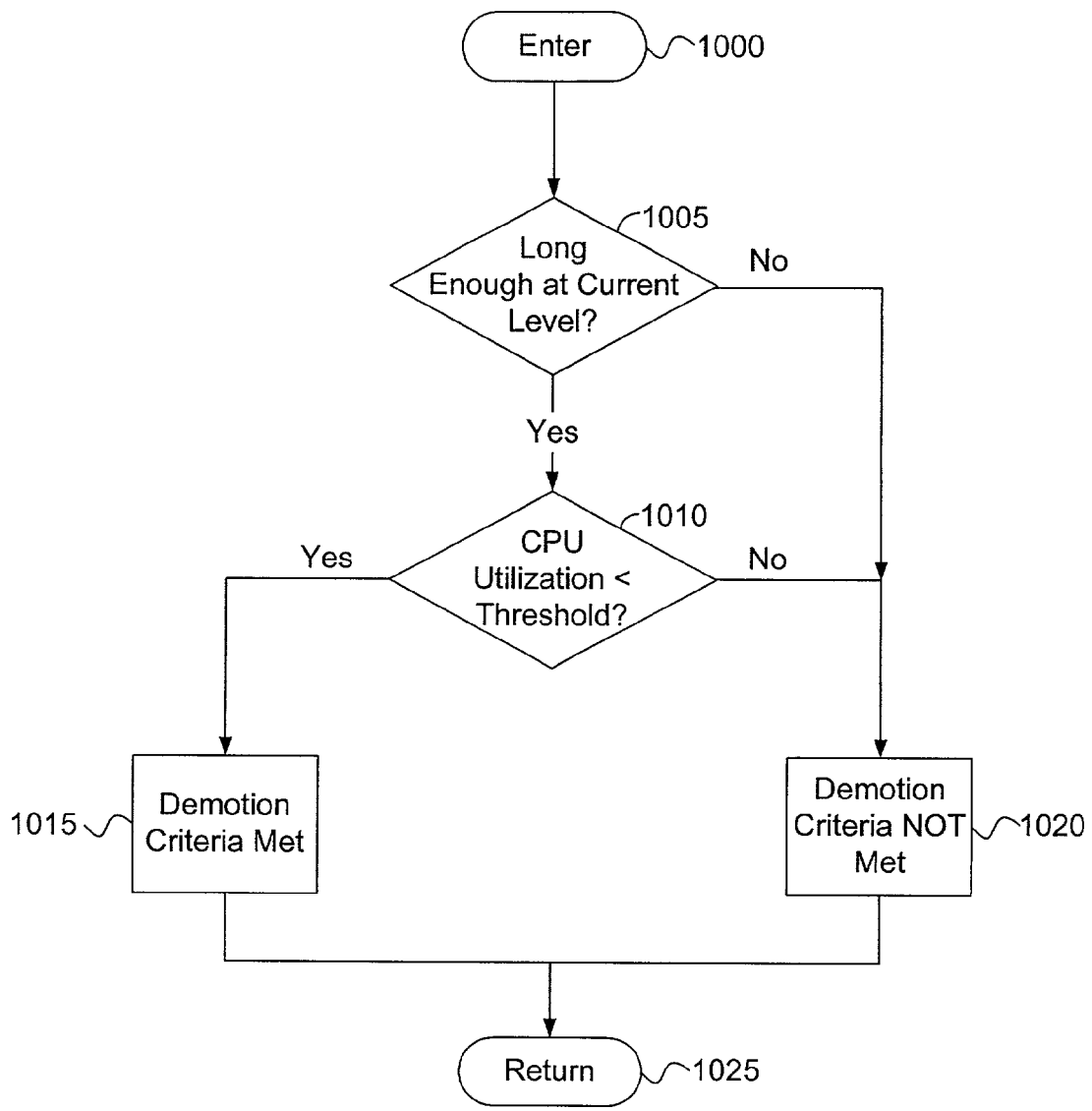
FIG. 10 is a logical flow diagram illustrating a process to determine if CPU utilization justifies a decrease in the CPU performance level, according to one embodiment of the invention.

FIG. 10 is a logical flow diagram illustrating a process to determine if prior CPU utilization justifies a decrease in the CPU performance level, according to one embodiment of the invention. The process enters at block 1000 from decision block 825 of FIG. 8, after the prior CPU utilization has been calculated.

At block 1005, a determination is made as to whether the CPU performance level has been at its current level long enough. The purpose of this logic is to avoid the problems associated with frequent transitions as described in conjunction with FIG. 5. Some experimentation may be necessary to determine an appropriate amount of time the CPU performance level should remain the same as described in conjunction with FIG. 9. If the CPU performance level has been at the same level long enough the yes branch is followed and processing continues at block 1010. If the CPU performance level has not been at the same level long enough, the no branch is followed and processing continues at block 1020. For example, referring to FIG. 3, CPU throttler 315 uses information from CPU utilization history 330 to determine whether the CPU performance level has been at the same level long enough.

At block 1010, it is determined whether the prior CPU utilization is less than a threshold. Typically, the threshold is set somewhat lower than the maximum CPU utilization at the current CPU performance level. If the threshold for decreasing the CPU performance level (the lower threshold) is too close to the threshold for increasing the CPU performance level (the upper threshold), a CPU throttler may continually fluctuate between a higher and a lower CPU performance level. In other words, putting some distance between the lower and upper thresholds helps avoid the CPU performance level oscillation problems discussed in conjunction with FIG. 5.

To further explain the problems associated with setting thresholds too close to each other, consider a DVD playback that on average consumes 79% of total available performance from the CPU but occasionally consumes 84% and occasionally consumes 76%. Also, assume that a computer must use one CPU performance level to utilize 80–100% of the CPU and another CPU performance level to utilize 70–79% of the CPU. If an upper threshold is set at 79% and a lower threshold is set at 78%, the computer may skip several DVD frames because of constantly changing the CPU performance level in response to continually crossing the upper and lower thresholds. If the upper threshold is set at 79% and the lower threshold is set at 75%, once the higher CPU performance level is reached, there will be no transitions to the lower CPU performance level (as the 75% threshold is not crossed) and DVD frames will likely not be skipped. For example, referring to FIG. 3, CPU throttler 315 uses the information received from CPU utilization monitor 320 to determine if the utilization is less than the lower threshold. If so, the yes branch is followed to block 1015. Otherwise, the no branch is followed to block 1020.

At block 1015, the demotion criteria have been met. Further calculations can use this information to act appropriately. For example, referring to FIG. 3, CPU throttler 315 determines that the demotion criteria have been met and sets a demotion flag (not shown).

At block 1020, the demotion criteria have not been met. Further calculations can use this information to act appropriately. For example, referring to FIG. 3, CPU throttler 315 determines that the demotion criteria have not been met and does not set a demotion flag (not shown).

At block 1025, the process ends. At this point, it is known whether the demotion criteria have been met.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for adaptively throttling a computer, comprising:
    measuring a prior utilization of the computer while a CPU of the computer is idle, wherein the prior utilization is measured by resolving user time, kernel time, and idle time within a time period into a utilization percentage that corresponds to the prior utilization, and wherein the CPU is considered to be idle despite the CPU polling for work and checking for pending deferred procedure calls; and
    if the prior utilization crosses a threshold, modifying a parameter associated with the CPU.

2. The method of claim 1, wherein the parameter comprises a clock frequency.

3. The method of claim 1, wherein the parameter comprises a voltage.

4. The method of claim 1, further comprising:
storing the prior utilization in a utilization history database.

5. The method of claim 4, further comprising:
accessing the utilization history database to determine if the CPU has been at a performance level for a sufficient period of time.

6. The method of claim 1, wherein the threshold indicates that a performance level allocated with the CPU should be increased.

7. The method of claim 6, further comprising:
applying a system policy to determine whether to increase the performance level of the CPU.

8. The method of claim 7, wherein the system policy comprises a heat performance limit related to a temperature sensed near the CPU.

9. The method of claim 7, wherein the system policy comprises a battery performance limit related to a battery level of a battery supplying the computer with power.

10. The method of claim 7, wherein the system policy relates to a switching latency of the CPU.

11. A computer-readable medium having at least one physical media, the computer-readable medium having computer-executable instructions for adaptively throttling a computer including a CPU having a CPU performance level, comprising:
calculating a prior utilization of the CPU while the CPU is idle, wherein the prior utilization is measured by resolving user time, kernel time, and idle time within a time period into a utilization percentage that corresponds to the prior utilization, and wherein the CPU is considered to be idle despite the CPU polling for work and checking for pending deferred procedure calls; and
calculating a utilizable CPU performance level using the prior utilization.

12. The computer-readable medium of claim 11, further comprising:
calculating a thermal CPU performance limit using temperature information associated with the CPU; and
changing the CPU performance level to a minimum of the utilizable CPU performance level and the thermal CPU performance limit.

13. The computer-readable medium of claim 11, further comprising:
calculating a battery CPU performance limit using battery charge information associated with a battery supplying power to the CPU; and
if the battery CPU performance limit is less than the utilizable CPU performance level and the battery CPU performance limit is less than the thermal CPU performance limit, changing the CPU performance level to the battery CPU performance limit.

14. The computer-readable medium of claim 11, further comprising:
changing the CPU performance level to the utilizable CPU performance level.

15. The computer-readable medium of claim 12, wherein changing the CPU performance level occurs at an expiration of a timer.

16. The computer-readable medium of claim 15, further comprising:
if the minimum performance level is equal to a maximum performance level of the CPU, disabling the timer.

17. The computer-readable medium of claim 15, further comprising:
if the new performance level is less than a maximum performance level of the CPU, resetting the timer.

18. A system for adaptively throttling a computer including a CPU having a CPU performance level, comprising:
a CPU utilization monitor configured to monitor a utilization of the CPU, wherein a prior utilization for the CPU is measured by resolving user time, kernel time, and idle time within a time period into a utilization percentage that corresponds to the prior utilization;
a CPU throttler configured to perform the adaptive throttling of the CPU based on information from the CPU utilization monitor; and
a timer configured to monitor a time since an idle state, wherein the CPU throttler is activated when the CPU enters an idle state, and wherein the CPU is considered to be in idle state despite the CPU polling for work and checking for pending deferred procedure calls.

19. The system of claim 18, wherein the CPU is activated when the time since the last idle state exceeds a threshold.

20. The system of claim 18, further comprising:
a thermal policy manager configured to monitor a temperature near the CPU wherein the thermal policy manager activates the CPU throttler when the temperature crosses a threshold.

21. The system of claim 18, further comprising:
a degradation policy manager configured to receive a charge level from a battery sensor monitoring a battery wherein the degradation policy manager activates the CPU throttler when the charge level crosses a threshold.

22. The system of claim 18, wherein the CPU throttler changes the CPU performance level in response to a utilization of the CPU measured by the CPU utilization monitor.

23. The system of claim 18, wherein upon activation, the CPU throttler resets the timer.

* * * * *